United States Patent [19]

Taig

[11] 4,418,583
[45] Dec. 6, 1983

[54] LOCKING DEVICE

[75] Inventor: Alistair G. Taig, South Bend, Ind.

[73] Assignee: The Bendix Corporation, Southfield, Mich.

[21] Appl. No.: 280,751

[22] Filed: Jul. 6, 1981

[51] Int. Cl.³ .............................................. F16C 1/10
[52] U.S. Cl. .............................. 74/501.5 R; 403/320; 403/46; 411/417; 411/432; 192/111 B
[58] Field of Search .......... 74/501.5 R, 501 R, 501 P; 192/111 B; 188/67; 403/343, 349, 195, 320, 46; 411/417, 418, 437, 432

[56] References Cited

U.S. PATENT DOCUMENTS

| | | | |
|---|---|---|---|
| 1,510,492 | 10/1924 | Caron et al. | 411/432 |
| 2,464,133 | 3/1949 | Herbert | 411/432 |
| 2,828,662 | 4/1958 | Antal | 411/437 |
| 3,496,800 | 2/1970 | Brezinski | 411/437 |
| 3,708,145 | 1/1973 | Pestka | 411/432 |
| 4,125,049 | 11/1978 | Price | 411/432 |
| 4,261,221 | 4/1981 | Kobayashi | 74/501 P X |
| 4,274,754 | 6/1981 | Cohen | 403/320 |
| 4,334,438 | 6/1982 | Mochida | 74/501.5 R |
| 4,355,920 | 10/1982 | Graham | 74/501 R |

FOREIGN PATENT DOCUMENTS

| | | | |
|---|---|---|---|
| 1014454 | 7/1977 | Canada | 411/417 |
| 555656 | 4/1923 | France | 411/437 |
| 286968 | 2/1965 | Netherlands | 411/417 |

*Primary Examiner*—Leslie A. Braun
*Assistant Examiner*—Anthony W. Raskob, Jr.
*Attorney, Agent, or Firm*—Paul David Schoenle; Ken C. Decker

[57] ABSTRACT

A lock device (30) is provided to securely attach with an elongate member (16). The locking device (30) includes a pair of parts (32, 34) with openings for receiving the elongate member (16). One of the parts (32) is prevented from rotating on the elongate member (16) and the other part 34 forms teeth (48) which are capable of engaging teeth (40) on the elongate member (16) to prevent axial movement of the pair of parts (32, 34) on the elongate member (16).

7 Claims, 5 Drawing Figures

LOCKING DEVICE

This invention relates to a locking device for an elongate member, such as a cable assembly in a vehicle. Examples of such cable assemblies are transmission cable assemblies and clutch cable assemblies.

With respect to the transmission cable assembly, the end of the cable is adjusted during assembly by means of friction or by a nut and bolt assembly to rigidly couple the end of the cable assembly with either a shift lever or a transmission lever. Because of vehicle vibration and friction slippage, it is possible for these type of one shot adjusters or locking devices to work loose and introduce undesirable slack into the cable assembly.

The present invention provides a locking device for attachment to an elongate member, said locking device comprising a first part (32) and a second part (34), each of said parts defining an opening (36, 46) through which said elongate member (16) extends, each of said parts being movable axially on said elongate member (16) in a first mode of attachment with said elongate member, one of said parts (34) being rotatable relative to said elongate member (16) and said other part (32) to define a second mode of attachment for said parts with said elongate member (16) wherein said first and said second parts (32, 34) are releasably locked to said elongate member (16) to prevent axial movement of said first and second parts (32, 34) relative to said elongate member (16).

It is an advantage of the locking device disclosed herein that a positive stop is established by the parts of the locking device and the elongate member so that friction is not relied upon to maintain the locking device in its attached mode.

One embodiment of the present invention is illustrated in the accompanying drawings, in which.

Figure 1:
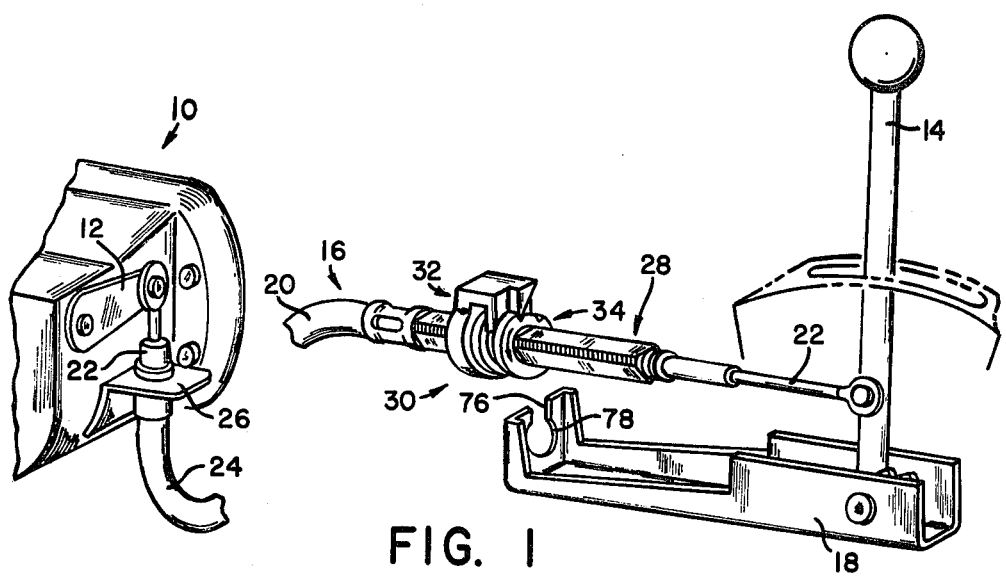
FIG. 1 is an illustration of a cable assembly used for connecting a shifter with a transmission shown immediately before adjustment and attachment to a support.

In FIG. 1, a transmission generally indicated at 10, is provided with the usual settings, such as, drive, reverse, neutral, park, etc. A lever 12 is operatively connected to the gears of the transmission to control the setting therefore. Within a vehicle compartment, a shifter 14 is provided to remotely select the setting for the transmission. A cable assembly 16 connects the shifter to the transmission and a support 18 mounts the shifter on the vehicle. The cable assembly 16 comprises an elongate member such as a sheath or conduit 20 with a longitudinally extending bore for movably receiving a cable 22. One end 24 of the sheath adjacent the transmission is fixed to a bracket 26 and the end of the cable 22 at the one end 24 is connected to the lever such that movement of the cable 22 within the conduit 20 changes the setting for the lever and gears of the transmission. The cable 22 extends from the other end 28 of the conduit 20 to connect with the shifter 14. The other end 28 of the conduit 20 supports a locking device 30 constructed in accordance with the present invention and adapted to fix the end 28 of the conduit 20 to the support 18 after the cable assembly is adjusted to index the transmission 10 and the shifter 14 to the same settings.

In accordance with the invention, the locking device 30 comprises a first part 32 and a second part 34 made from a light weight plastic material. The first part 32 forms a triangular opening 36 which substantially matches the cross sectional dimension of a rigid extension 38 swaged to the conduit 20 and considered to be a part thereof. The extension 38 also defines teeth 40 at three edges of the triangle and flat surfaces 42 separate the teeth from each other. The flat surfaces 42 slidably engage the wall of the triangular opening 36 so that the first part 32 can move longitudinally on the extension 38 but can not rotate relative thereto, when the extension extends into the opening 36. The second part 34 also forms an opening 46 with three portions of teeth 48 and three portions of smooth surfaces 50. The teeth 48 are capable of meshing with the teeth 40 on the extension 38 and the smooth surfaces 42 form a diameter large enough to permit the triangular extension to freely rotate and slide within the opening 46 relative to the smooth surfaces 42. When the teeth 48 and 40 are engaged, the second part is prevented from moving longitudinally relative to the extension 38, however, when the teeth 40 are aligned with the surfaces 50, the second part 34 is free to move longitudinally on the extension 38.

Figure 2:
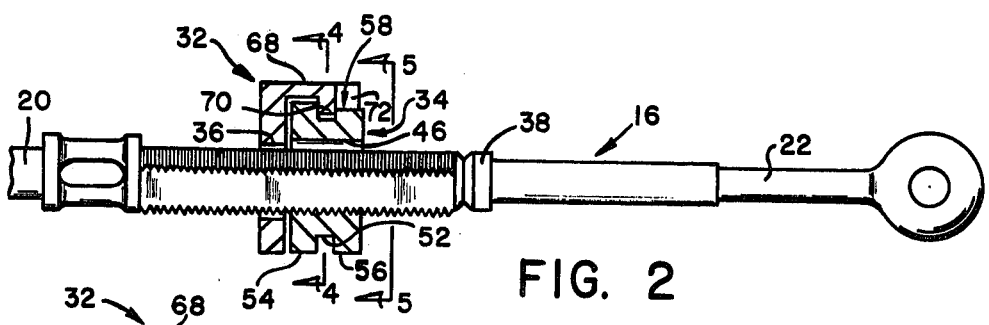
FIG. 2 is a side view of the cable assembly and a locking device constructed in accordance with the present invention with the locking device attached to the cable assembly.
Figure 5:
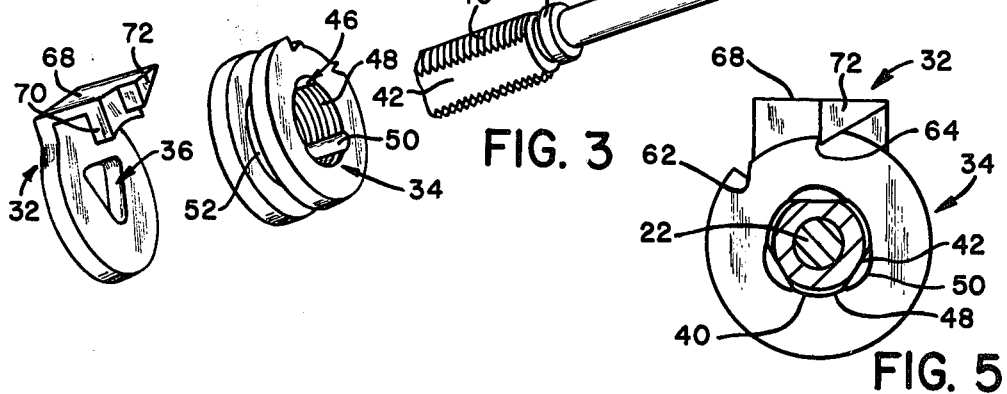
FIG. 5 is an enlarged cross sectional view taken along line 5—5 of FIG. 2.

Turning to FIGS. 2 and 5, the second part forms an annular recess or groove 52 between a pair of radial flanges 54 and 56. The flange 56 includes a reduced diameter portion 58 with a pair of grooves 62 and 64. The first part 32 includes axially extending flange 68 overlaying the radial flange 54 and forming a tab or tongue 70 and a finger 72. The tab 70 extends into the recess 52 and the finger 72 fits into the groove 62 or 64 when the parts 32 and 34 are carried on the extension to form a releasable latch at 62, 64 and 72. The flange 68 is resiliently biased into either groove 62 or 64 so that the finger remains in the groove until manual removal by rotating part 34 relative to part 32.

Figures 3, 4:
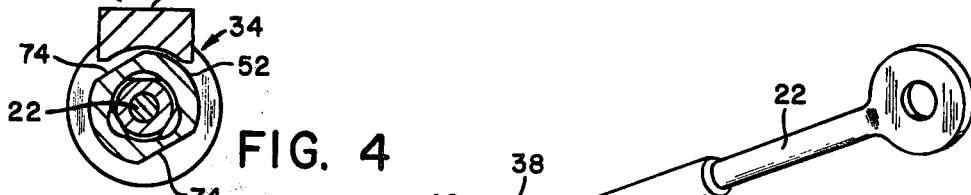
FIG. 3 is an exploded perspective view of the cable assembly and locking device when the locking device is orientated for attachment to the cable assembly.
FIG. 4 is a cross sectional view taken along line 4—4 of FIG. 2.

In FIG. 4 it is seen that the recess 52 is cut away at opposite locations to form a reduced diameter section 74 which substantially matches the diameter of a slot 76 leading to an opening 78 on support 18, see FIG. 1. The diameter of opening 78 is substantially the same as the diameter of the recess 52.

During assembly, the first part 32 is attached to the second part 34 so that the tab 70 is disposed in the recess 52 and the finger 72 is disposed in the groove 62. The coupled parts are fitted on the extension 38 with the teeth 48 of second part 34 aligned with the flat surfaces 42 on extension 38. Consequently, the parts will freely move axially on the extension. Next, the cable 22 is connected to the lever 12 and the shifter 14. The shifter 14 and the transmission are indexed to the same setting and the locking device 30 is moved axially on the extension 38 to align the recess 52 with the slot 76. The locking device is fitted through the slot 76 and into the opening 78. It is noted that the arcuate width of flange 68 is equal to or less than the width of the slot 76 so that the flange fits into the slot 76. In order to fixedly attach the locking device 30 to the support 18 as well as simultaneously fix the extension 38 to the support 18, the second part 34 is rotated counter clockwise to the position shown in FIGS. 4 and 5, viewed from the shifter 14, so that the finger 72 is fitted into groove 64 to prevent rotation between the parts. At the same time, the reduced diameter section 74 is rotated out of alignment with the slot 76 so that the second part is coupled to the support to prevent the second part from withdrawing from the slot 76 and opening 78, thereby preventing separation between the locking device 30 and the support. With the finger 72 positioned in groove 64, the teeth 48 on the second part 34 are engaged with the teeth 40 on the extension so that the second part prevents axial movement between the extension 38 and the support 18. Any slight angular movement of the extension 38 is accompanied by the same angular movement of parts 32 and 34 as the part 32 rotates with the extension 38 because of its contoured opening 36 to also rotate the part 34 with the extension. Consequently, the teeth 48 remain fully engaged with the teeth 40 regardless of a slight, rotational movement for the extension 38.

Many variations to the locking device 30 are feasible by one skilled in the art. For example, it is possible to engage the first part 32 with the support 18 rather than engage the second part therewith. Also, second part 34 could be provided with a flexible finger and the first part could be provided with grooves for receiving the flexible finger. These variations as well as others which are feasible by one skilled in the art are intended to be covered by the scope of the appended claims.

I claim:

1. A locking device attached to an elongate member said locking device comprising at least a first part and a second part, each of said parts defining an opening through which said elongate member extends, each of said parts being axially movable together on said elongate member in a first mode of attachment with said elongate member, one of said parts being rotatable relative to said elongate member and to said other part to define a second mode of attachment for said parts with said elongate member wherein said first and said second parts are releasably locked to said elongate member to prevent axial movement of said first and second parts relative to said elongate member, and said other part cooperating with said elongate member to prevent rotation therebetween in the first and second modes.

2. The locking device of claim 1 further characterized by said first and second parts forming a tongue and groove connection when said first and second parts are mounted on said elongate member to provide uniform axial movement for said first and second parts relative to said elongate member.

3. The locking device of claim 1 further characterized by said first and second parts cooperating to form a releasable latch for maintaining said parts in their second mode of attachment.

4. The locking device of claim 1 further characterized by said one part 34 defining a recess said other part including a flange with a tab extending into said recess to substantially prevent axial movement between said parts and said flange further defining a finger cooperating with said other part to oppose rotation between said parts.

5. The locking device of claim 4 further characterized by a support engageable with said one part to prevent axial movement of said elongate member, said support extending into said one part recess to attach the locking device thereto.

6. The locking device of claim 1 further characterized by said elongate member including an outer surface defining a first set of teeth partially covering the outer surface within said part openings, said one part opening including an inner surface defining a second set of teeth partially covering the inner surface, and said first and second sets of teeth are meshed together to form a positive lock preventing longitudinal movement of said one part relative to said elongate member when said one part is rotated relative to said elongate member.

7. A locking device for attachment to an elongate member said locking device comprising at least a first part and a second part, each of said parts defining an opening through which said elongate member extends, each of said parts being movable axially on said elongate member in a first mode of attachment with said elongate member, one of said parts being rotatable relative to said elongate member and said other part to define a second mode of attachment for said parts with said elongate member wherein said first and said second parts are releasably locked to said elongate member to prevent axial movement of said first and second parts relative to said elongate member said elongate member including a substantially triangular cross section with the edges of the triangular cross section defining gripping surfaces at the edges and the triangular cross section forming sliding surfaces between the edges.

* * * * *